Figure 1:
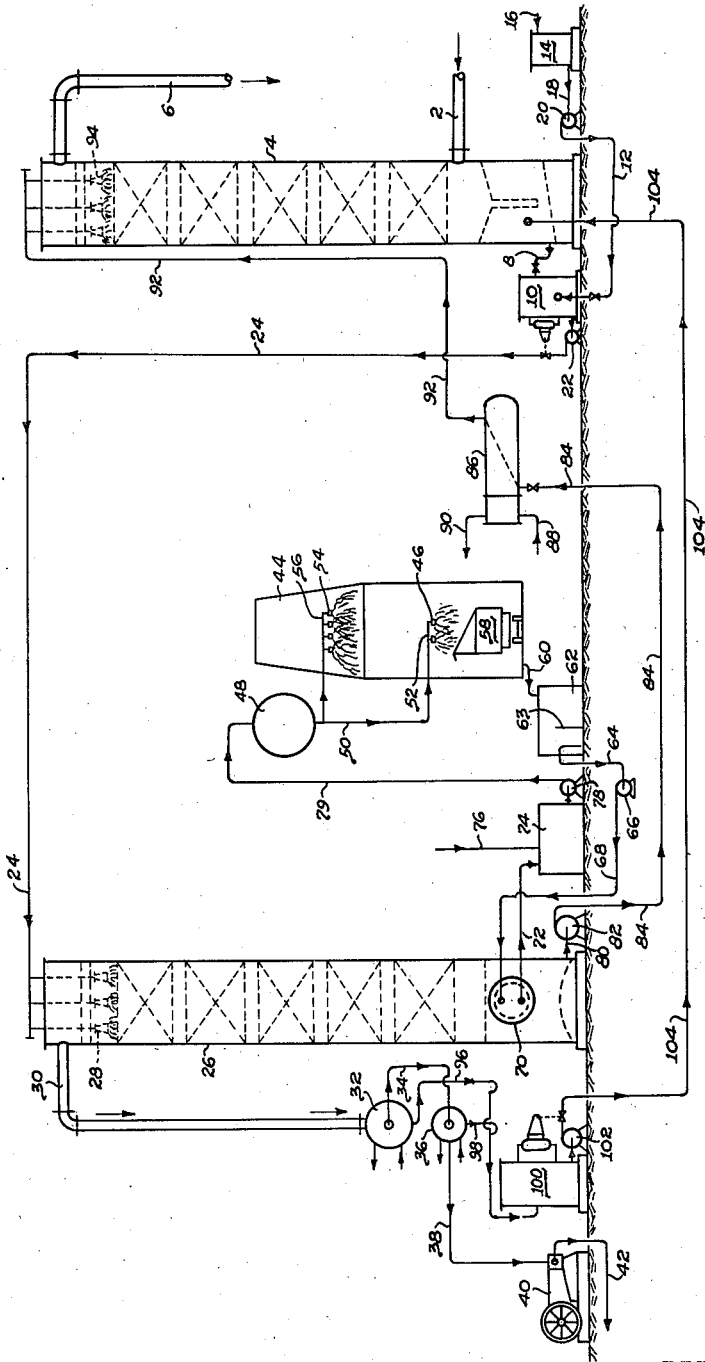

March 22, 1949.　　J. MITCHELL ET AL　　2,464,824
GAS PURIFICATION PROCESS
Filed Feb. 20, 1945　　2 Sheets-Sheet 1

INVENTORS.
HERBERT A. GOLLMAR.
& JOHN MITCHELL
BY Edmund G. Borden
their ATTORNEY.

INVENTORS
HERBERT A. GOLLMAR &
JOHN MITCHELL.
BY
their ATTORNEY.

Patented Mar. 22, 1949

2,464,824

UNITED STATES PATENT OFFICE 2,464,824

GAS PURIFICATION PROCESS

John Mitchell and Herbert A. Gollmar, Pittsburgh, Pa., assignors to Koppers Company, Inc., Pittsburgh, Pa., a corporation of Delaware Application February 20, 1945, Serial No. 578,862

5 Claims. (Cl. 23—3)

The present invention relates to the liquid purification of byproduct coke-oven gas in respect of the separation and recovery of hydrogen sulphide and other absorbable gases therefrom. More particularly the invention relates to a process for the separation and recovery of hydrogen sulphide by scrubbing coke-oven gas with aqueous absorbent and actifying the absorbent for further scrubbing by heating it under subatmospheric pressure. The invention furthermore comprehends certain novel provisions in the method of quenching byproduct coke which constitute improvements both in the quenching method alone and in the economy of its operation in conjunction with the liquid purification process. Reference is hereby made to joint inventor Gollmar's U. S. Patent 2,379,076 which relates to a similar process of gas purification.

A primary object of the present invention is to provide improvements in a process for separation and recovery of absorbable constituents from coke-oven gas whereby economy of operation is obtained.

Another object of the invention is to provide a process for purification of a fluid product of a coke oven, which process is more closely articulated with the system of a byproduct coke plant in order that overall advantages of economical operation can be obtained.

A further object of the invention is the provision of gas purification process and a coke-quenching operation that are so adapted as to provide mutual interchange economies and especially utilization of waste heat of such low thermal head that it has not previously been made available in the coke-plant system.

The invention has for further objects such other improvements and such other operative advantages or results as may be found to obtain in the processes or apparatus hereinafter described or claimed.

Briefly stated, the present invention consists in a process for recovering an absorbable constituent such as hydrogen sulphide from coke-oven gas, or other fluid product of a coke-oven battery such as light oil, by scrubbing it with a liquid absorbent; actifying the absorbent under reduced pressure and liberating absorbable constituent dissolved therein by utilizing the heat of hot coke-plant quenching liquor to form water vapor and therewith sweep the absorbed constituent from the absorbent. The water vapor can be formed either directly from the quenching liquor or indirectly by heating the absorbent under vacuum with hot quenching liquor. In the usual methods of quenching which include necessarily, for purpose of economy, recirculation of the quenching fluid, the above mentioned heating of the actified solution results in the simultaneous cooling of the recirculated fluid, and consequent economies in quencher operation are thereby realized.

It is the most common practice to quench hot coke immediately after its discharge from the coke oven with one spray or several intermittent sprays of quenching water, the steam that is formed being permitted to escape to the atmosphere and the hot water remaining and which is herein termed the quenching liquor, being recirculated to quench a succeeding batch of hot coke.

The open-water quenching system is in use in most coke plants particularly because it is simpler in operation and cheaper than more elaborate systems to install; and it is to this system that the present invention is particularly adapted whereby it is especially capable of widespread application and of providing greater heat economies.

Figure 2:
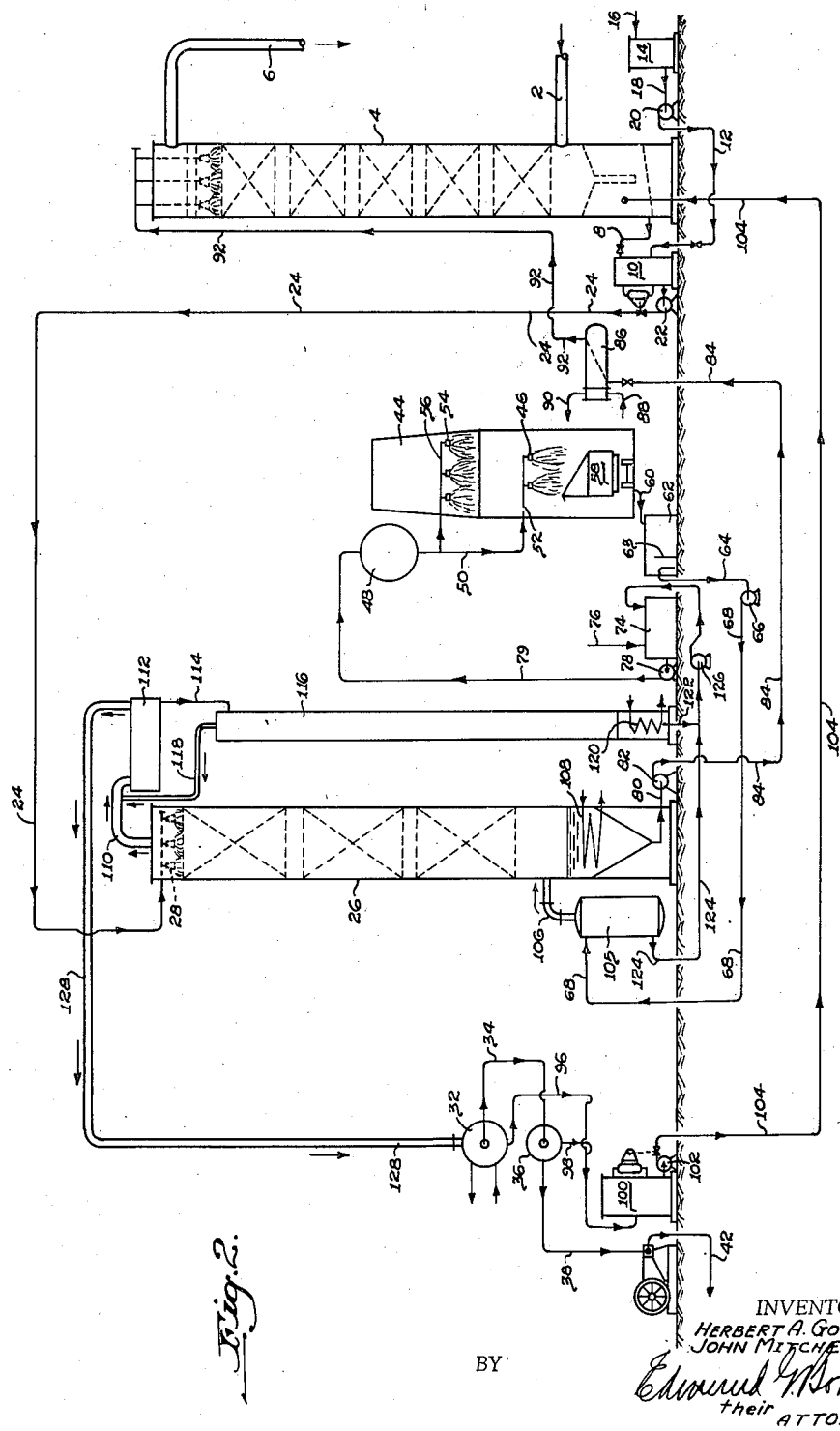

In the accompanying drawings forming a part of this specification and showing for purposes of exemplification preferred apparatus in which the invention may be embodied and practiced but without limiting the claimed invention specifically to such instances:

Fig. 1 is a diagrammatic elevational view of apparatus for the continuous separation and recovery of hydrogen sulphide from coke-oven gas with indirect utilization of heat from the coke-quenching system in the hydrogen-sulphide recovery; and Fig. 2 is a diagrammatic elevational view of apparatus for the continuous separation and recovery of hydrogen sulphide from coke-oven gas with direct utilization of the heat and the vapors of quenching liquor in the hydrogen-sulphide recovery system.

Referring now to Fig. 1, coke-oven gas containing hydrogen sulphide flows through a pipe 2 into an absorber 4 containing packing and in which the said gas rises in counter-current contact with continuously descending absorbent, for example, an aqueous solution of sodium carbonate and acid carbonate. The said sodium carbonate solution in the absorber 4 absorbs hydrogen sulphide from the counter-currently flowing coke-oven gas. The so-treated coke-oven gas leaves the absorber at the top thereof and flows to additional apparatus of the byproduct system through the pipe 6. Fouled absorbent solution flows from the bottom of the absorber 4 through a valved pipe 8 into a pumping tank 10 to which also is delivered through a valved pipe 12 freshly made up absorbent. The said make-up absorbent is prepared in a mixing tank 14 to which is delivered water and, for example, sodium carbonate through a pipe 16 and is mixed in said tank. The fresh absorbent is pumped from the mixing tank 14 through a pipe 18 by pump 20 and through the said pipe 12 to the hereinbefore mentioned pumping tank 10. Fouled absorbent from the pumping tank 10 is driven by a pump 22 through pipe 24 into the top of an actifier column 26 and distributed through nozzles 28 in a descending flow down over packing in said column. In the actifier 26 the fouled absorbent is brought into direct contact with rising countercurrently flowing gases and vapors which continuously liberate dissolved hydrogen sulphide from the fouled absorbent, and which thereby actify the downflowing absorbent.

The relatively cool fouled absorbent flowing into the top of the actifier 26 also acts as a condensing medium partially to condense steam from the said vapors which pass through the actifying column.

The hydrogen sulphide and remaining steam in admixture therewith are flowed from the top of the actifier 26 through a pipe 30 into a condenser 32 wherein a larger portion of the remaining steam is condensed. Thence the hydrogen sulphide flows through pipe 34 to a second condenser 36, of smaller dimension in which substantially the remainder of the steam is condensed. Substantially dry hydrogen sulphide is continuously withdrawn from the said condenser 36 through pipe 38 by a vacuum pump 40 by which means the entire actification zone is held under less than atmospheric pressure and by which means also the hydrogen sulphide is pumped through a pipe 42 to any point for utilization thereof. Hydrogen cyanide which is also recovered from the gas by the described process can be separated from the hydrogen sulphide by any of several known processes whereby substantially pure hydrogen cyanide and hydrogen sulphide can be obtained.

A coke-plant quenching station 44 is equipped with a standard bank of nozzles 46 to which water is delivered from storage tank 48 through pipe 50 and spray header 52. The quencher is also supplied with a set of auxiliary sprays 54 to which water is delivered from the storage tank 48 through the pipe 50 and a spray header 56. This auxiliary spray is disposed in a horizontal plane above the standard spray nozzles 46 and is so arranged that the water spray therefrom will fall through steam that rises from hot coke in quenching car 58 and has been formed by the evaporation by the said hot coke of water from the sprays 46. This extra spray lowers the rate of water loss by reducing the release of steam to the atmosphere and also provides a quenching liquor at slightly higher temperature which increases the usefulness of the quenching liquor in supplying heat to the gas purification process. The quenching liquor from each quench drains through a pipe 60 into a storage sump 62 called a hot well. A baffle or screen 63 may be placed in this hot well to screen out breeze and coke abrasive matter from the quenching liquor. Hot quenching liquor is withdrawn from this hot well through a pipe 64 and is pumped by a pump 66 through a pipe 68 into the coils of a reboiler 70 in the base of the actifier 26. The cooled liquor flows from the reboiler 70 through a pipe 72 into a second storage sump 74 termed the cold well, to which make-up water can be delivered through a pipe 76 and from which the relatively cool quenching water is pumped by a pump 78 through a pipe 79 and into the storage tank 48.

The heat of the quenching liquor in the reboiler 70 that is transferred into the absorbent solution in the actifier boils the solution under the reduced pressure of the actifier and produces the said vapors which flow countercurrently to the downflowing foul solution and actify it as aforementioned.

Actified absorbent is withdrawn from the bottom of the said actifier 26 through the pipe 80 and is pumped by pump 82 through a pipe 84 to a cooler 86 that is conveniently supplied with inlet and outlet cooling-water pipes 88 and 90, respectively. Cooled, actified absorbent is flowed from the said cooler 86 through valved pipe 92 to the top of the said absorber 4 into which it is sprayed by nozzles 94 upon the packing provided therein.

Condensed steam is flowed from the said condensers 32 and 36 through pipes 96 and 98 respectively into a pumping tank 100. Collected condensate is withdrawn by a pump 102 from the said tank 100 through a pipe 104 and is pumped into the bottom of the absorber 4 at which point the condensate is mixed with fouled absorbent in order that it may simultaneously be actified and treated for removal of any hydrogen sulphide dissolved therein.

In a second embodiment of the present invention as illustrated in Fig. 2, substantially an identical gas purification system proper is employed and the same characters of reference are therefore used, wherever practicable, to point out identical parts and simplify the description.

Thus, coke-oven gas is purified in an absorber 4; the fouled solution is delivered therefrom to the actifier 26 and is actified therein under subatmospheric pressure. The actified solution is withdrawn from the actifier 26 and is pumped through a cooler 86 and into the top of the absorber 4 for the purification of further quantities of coke-oven gas.

Here again a coke plant quenching station 44 is equipped with two sets of sprays 46 and 54 and, for the same purpose. Quenching liquor therefrom drains to a hot well 62 through a pipe 60 and is pumped by a pump 66 from the well 62 through a pipe 68 into a vaporizer 105. The atmosphere within the shell of the vaporizer 105 is maintained at the reduced pressure of vacuum actifier 26 and consequently when the relatively hot quenching liquor is discharged into the vaporizer a portion of the liquor vaporizes while the remainder thereof which has been cooled by the vaporization flows to the bottom thereof. The said vapors flow into the actifier 26 through a pipe 106 and ascend therein in countercurrent flow in respect of descending fouled solution. The said vapors sweep the hydrogen sulphide and like gas from the fouled solution by effecting a removal of the partial pressure of hydrogen sulphide in the vapors in the actifier and thus by such direct contact actify the absorbent solution. The introduction of a small amount of supplemental heat may be found to increase the efficiency of the process and often would be needed especially if the described additional quenching sprays were not installed. Accordingly a small steam coil 108 is shown in the base of the actifier 26.

The so-formed vapors and gases containing hydrogen sulphide pass from the top of the actifier through a pipe 110 and into a relatively large condenser 112 in which a major portion of the vaporized quenching liquor is condensed. The condensate flows through a pipe 114 into the top of a stripping column 116 in which the condensate is stripped of its hydrogen sulphide by the stripping action of vapors formed by boiling the condensate in the base of the column 116. The column acts as a reflux condenser and returns substantially all the evaporated liquor to the base of the column. Hydrogen sulphide and like gases liberated in this column flow through pipe 118 and are returned to the gas flow in pipe 110. Heat for the stripping column is supplied by a small steam coil 120.

Condensate flows from the bottom of the column 116 through a pipe 122, and together with the condensate from vaporizer 105, which flows therefrom through a pipe 124, is pumped by a pump 126 into a cold well 74. Make-up water can be delivered through a pipe 76 into the cold well and quenching water is pumped therefrom by a pump 78 through a pipe 79 into the storage tank 48.

Gases containing hydrogen sulphide in preponderance and from which the major portion of water has been removed flow from the condenser 112 through a pipe 128 to condensing and vacuum-pumping means as hereinbefore described and illustrated also in Fig. 1.

It has been found that, particularly when employing the described auxiliary sprays, there is sufficient heat from the quenching liquor produced in quenching the total output of coke from a coke-oven battery to provide for substantially complete removal of hydrogen sulphide and hydrogen cyanide from the total gas output of such battery. The auxiliary heat supplied in coils 108 and 120 in Fig. 2 is comparatively small and can be conveniently supplied with low pressure steam or can be readily supplied with a portion of the hot quenching liquor as when its volume is increased by the extra water that is used in the auxiliary sprays.

In an example of operation according to the method of invention illustrated in Fig. 1, water at 140° F. sprayed from the upper nozzles 54 was raised in temperature to 177° F. by condensing steam in the quenching station 44. By these sprays 8% of the heat which is ordinarily lost with the steam is recovered. A larger quantity of water at 140° F. is sprayed on the coke from the standard sprays. The average temperature of the water in hot well 62 is 185° F. In another instance where intermittent quenching was employed, that is, when the coke is quenched for a short period of about one-half a minute, and then, after a moment, it is quenched again for approximately an equal period, the temperature of the quenching liquor from the first period was 188° F. and from the second 182° F. The hot vacuum actifier is operated at a temperature of 135° F. The quenching liquor at 185° F. is delivered to the reboiler, 70 wherein its heat is employed to produce vapors in the actifier for removal of hydrogen sulphide. Based on the average range of hydrogen sulphide concentration in the gas and the usual practicably attainable vacuums a temperature of at least about 125° F. is required to provide substantially complete actification. The water leaving the reboiler has a temperature of about 149° F. On the basis of the heat obtainable from quenching the coke from one oven and purifying the gas from one oven, the heat load of the vacuum actifier is 177,000 B. t. u. The regular quenching procedure, on the basis of the above temperatures and a quantity of quenching water of 3600 pounds, furnishes 72% of the required heat. The remainder is obtained by the said recovery of 8% of the heat formerly lost in the steam. The data of the above example is based on relatively complete purification of the gas.

The above-described process in addition to purifying coke-oven gas in respect of its hydrogen sulphide content provides as a product of the method a technical grade hydrogen sulphide that is suitable for the manufacture, for example, of sulphuric acid.

The herein described invention can be employed to improve the efficiency of any process for liquid purification wherein the fouled liquid absorbent containing a constituent which has been scrubbed from a gas or extracted from a liquid is actifiable under subatmospheric pressure by heating the same. An example of a liquid purification process similar to the one herewith described comprises the use of water to absorb ammonia and hydrogen cyanide from raw coke-oven gas, the water containing the absorbed gases being thereafter actifiable by heating at subatmospheric pressure. Aqueous absorbents can be, for example, water, aqueous solutions of potassium, sodium or other alkali metal carbonates and bicarbonates, solutions of alkali-metal salts of other weak acids, or solutions of weak bases such as organic amines. The absorbable constituent in coke-oven gas (coal gas) can be hydrogen sulphide, hydrogen cyanide, carbon dioxide, ammonia, light oil or carbon disulphide. The light oil and carbon disulphide can be recovered by scrubbing coke-oven gas with a straw oil and the light oil be stripped therefrom, under vacuum, by heat from the said quenching liquor. Such light oil for example can be purified in respect of removal of its hydrogen sulphide content by extraction of it with an alkaline aqueous solution which can thereafter be reactified under vacuum by the low-temperature heat recoverable from the quenching liquor.

As can readily be seen from the foregoing description the process of invention as hereinafter claimed, includes within its scope continuous operation of the improved liquid purification process and continuous recycling of absorbent solution and also quenching liquor.

The process as particularly described and as claimed is primarily adaptable to continuous operation. Although the invention as hereinbefore set forth is embodied in particular form and manner it may be variously embodied within the scope of the claims hereinafter made.

We claim:

1. A process for the separation of an absorbable constituent from coke oven gas, comprising: scrubbing the coke-oven gas with a liquid absorbent and absorbing coke-oven gas constituent therefrom; removing fouled absorbent containing the absorbed constituent from the absorption zone and flowing the same through an actification zone under less than atmospheric pressure; utilizing the heat at relatively low thermal head of hot quenching liquor from a coke quenching system to generate water vapor in the said actification zone and therewith sweep constituent, as a gas, from the fouled absorbent; preparing the said liquor by spraying the hot coke with water in two quenching stages, of which the second stage comprises spraying water into the steam evolved by the quenching step of the first stage and condensing a portion of the steam; and removing the so-liberated gas from the actification zone.

2. The process for the separation of an absorbable constituent of coke-oven gas, comprising: scrubbing the coke-oven gas with a liquid absorbent and absorbing coke-oven gas constituent therefrom; removing fouled absorbent containing the absorbed constituent from the absorption zone and flowing the same through an actification zone under less than atmospheric pressure; utilizing the heat at relatively low thermal head of hot quenching liquid from a coke-quenching system to generate water vapor in the said actification zone and therewith sweep constituent, as a gas, from the fouled absorbent, the hot quenching liquor being maintained at a temperature of at least about 170° F. by spraying hot coke with quenching water recirculated from the actification zone at a temperature of about 140° F., and in two stages, of which the second stage comprises spraying water into the steam evolved by the quenching step of the first stage and condensing a portion of the steam thereby providing a further volume of quenching water of the required temperature; and removing said liberated gas from the actification zone.

3. In the byproduct coking of coal to produce coke, coke-oven gas, and byproducts thereof, a process for the liquid purification of coke-oven gas and recovery of hydrogen sulphide therefrom comprising: scrubbing the total output of coke-oven gas from a coke-oven battery with an alkaline aqueous absorbent and absorbing hydrogen sulphide therefrom; removing fouled absorbent containing the dissolved hydrogen sulphide from the absorption zone and flowing the same through an actification zone under less than atmospheric pressure; quenching all of the coke of only the said coke-oven battery with water of sufficient volume therefor; condensing a portion of the steam evolved by the quenched coke with a further quantity of water; flowing it and the condensate onto the coke being quenched thus to aid in quenching and also to mix with the quenching liquor; liberating hydrogen sulphide from the said absorbent in the actification zone by means of heat transferred thereto from the hot mixed quenching liquor; recirculating the so-actified solution to the contact of further quantities of coke-oven gas; and removing liberated hydrogen sulphide from the actification zone.

4. In the byproduct coking of coal to produce coke, coke-oven gas, and byproducts thereof, a process for the liquid purification of coke-oven gas and recovery of hydrogen sulfide therefrom comprising: scrubbing coke-oven gas from a coke-oven battery with an alkaline aqueous absorbent and absorbing hydrogen sulfide therefrom; removing fouled absorbent containing the dissolved hydrogen sulfide from the absorption zone and flowing the same through an actification zone under less than atmospheric pressure; quenching all of the coke of the said coke-oven battery with water of sufficient volume therefor and in two stages of which the second stage comprises spraying water into the steam evolved by the aforesaid quenching step to condense a portion of the steam and provide a further volume of quenching liquor of required temperature, flowing quenching water employed in the second stage and condensate formed thereby upon the coke being quenched thus to aid in quenching and also to mix with quenching liquor from the first stage; liberating hydrogen sulfide from the said absorbent in the actification zone by means of heat transferred thereto from hot mixed quenching liquor; recirculating so-actified solution into contact with further quantities of coke oven gas; and removing liberated hydrogen sulfide from the actification zone.

5. The process as claimed in claim 4 wherein the hot quenching liquor is maintained at a temperature of at least about 170° F. by spraying hot coke with quenching water recirculated from the actification zone at a temperature of about 140° F.

JOHN MITCHELL.
HERBERT A. GOLLMAR.

REFERENCES CITED

The following references are of record in the file of this patent:

UNITED STATES PATENTS

| Number | Name | Date |
|---|---|---|
| 1,785,760 | Becker | Dec. 23, 1930 |
| 1,827,612 | Reber | Oct. 13, 1931 |
| 2,242,323 | Powell | May 20, 1941 |
| 2,368,600 | Rosenstein | Jan. 30, 1945 |
| 2,379,076 | Gollmar | June 26, 1945 |

Certificate of Correction

Patent No. 2,464,824. March 22, 1949.

JOHN MITCHELL ET AL.

It is hereby certified that error appears in the printed specification of the above numbered patent requiring correction as follows:

Column 1, line 33, before the word "interchange" insert *heat*; and that the said Letters Patent should be read with this correction therein that the same may conform to the record of the case in the Patent Office.

Signed and sealed this 6th day of September, A. D. 1949.

[SEAL]

THOMAS F. MURPHY,
*Assistant Commissioner of Patents.*